US012623426B2

(12) United States Patent
Adams et al.

(10) Patent No.: US 12,623,426 B2
(45) Date of Patent: May 12, 2026

(54) BALE EJECT DOOR ASSEMBLY FOR BALING PRESSES

(71) Applicant: C & M Baling Systems, Inc., Winston-Salem, NC (US)

(72) Inventors: Raymond Adams, Myrtle Beach, SC (US); Dennis Kelley, Carolina Shores, NC (US)

(73) Assignee: C & M Baling Systems, Inc., Winston-Salem, NC (US)

( * ) Notice: Subject to any disclaimer, the term of this patent is extended or adjusted under 35 U.S.C. 154(b) by 286 days.

(21) Appl. No.: 18/234,793

(22) Filed: Aug. 16, 2023

(65) Prior Publication Data

US 2024/0059040 A1 Feb. 22, 2024

Related U.S. Application Data

(60) Provisional application No. 63/398,686, filed on Aug. 17, 2022.

(51) Int. Cl.
*B30B 9/30* (2006.01)
*A01F 15/08* (2006.01)
*B65B 27/12* (2006.01)

(52) U.S. Cl.
CPC ........ *B30B 9/3014* (2013.01); *A01F 15/0875* (2013.01); *B65B 27/12* (2013.01); *A01F 15/0833* (2013.01)

(58) Field of Classification Search
CPC ............... B30B 9/3014; A01F 15/0833; A01F 15/0875; B65B 27/12
USPC ...................................................... 292/256.5
See application file for complete search history.

(56) References Cited

U.S. PATENT DOCUMENTS

| | | | |
|---|---|---|---|
| 257,152 A | 5/1882 | Dederick | |
| 446,600 A | 2/1891 | Kruse | |
| 1,631,881 A | 6/1927 | Murray | |
| 1,871,885 A | 8/1932 | Howard | |
| 2,576,784 A | 11/1951 | Dodds | |
| 2,699,107 A | 1/1955 | Strauss | |
| 2,770,184 A | 11/1956 | Smith | |
| 2,823,603 A | 2/1958 | Collins | |
| 2,879,709 A | 3/1959 | Nelson | |
| 2,882,813 A | 4/1959 | Nelson | |
| 3,024,719 A | 3/1962 | Englund | |
| 3,099,205 A * | 7/1963 | Lovrinch | .............. B30B 9/3032 100/255 |
| 3,212,434 A | 10/1965 | Raab | |
| 3,241,790 A | 3/1966 | Hudgins | |
| 3,350,999 A | 11/1967 | Morse | |
| 3,424,081 A | 1/1969 | Hoke | |
| 3,528,364 A | 9/1970 | Freund | |

(Continued)

FOREIGN PATENT DOCUMENTS

| | | | | |
|---|---|---|---|---|
| CN | 201456419 U * | 5/2010 | ........... | B30B 9/3032 |
| CN | 212097206 U * | 12/2020 | ............. | B30B 9/301 |

(Continued)

*Primary Examiner* — Jared O Brown
(74) *Attorney, Agent, or Firm* — FISHERBROYLES, LLP

(57) ABSTRACT

A bale eject door assembly designed to promote the safe opening of a bale eject door under pressure. The bale eject door assembly can include an end door engaged to and closing the bale exit end of a baling chamber on a baling press, a hinge, a door cylinder piston assembly and a locking mechanism.

19 Claims, 6 Drawing Sheets

(56)                    References Cited

U.S. PATENT DOCUMENTS

| | | | |
|---|---|---|---|
| 3,543,675 | A | 12/1970 | Angarola |
| 3,667,377 | A | 6/1972 | Persson |
| 3,918,358 | A | 11/1975 | Burford |
| 3,994,192 | A | 11/1976 | Faig |
| 4,120,238 | A | 10/1978 | Schafer |
| 4,167,902 | A | 9/1979 | Bister |
| 4,354,430 | A | 10/1982 | Horiuchi |
| 4,489,648 | A | 12/1984 | Naaktgeboren |
| 4,565,123 | A | 1/1986 | Sanders |
| 4,588,003 | A * | 5/1986 | Kaldenbach .......... B30B 9/3042 |
| | | | 100/295 |
| 4,718,336 | A | 1/1988 | Munro |
| 4,850,087 | A | 7/1989 | Gronau |
| 4,930,411 | A | 6/1990 | Naaktgeboren |
| 4,991,498 | A | 2/1991 | Mccurdy |
| 5,009,062 | A | 4/1991 | Urich |
| 5,052,098 | A | 10/1991 | Thumm |
| 5,299,407 | A | 4/1994 | Schuttler |
| 5,365,838 | A | 11/1994 | Valentini |
| 5,509,671 | A | 4/1996 | Campbell |
| 5,735,199 | A | 4/1998 | Esau |
| 5,899,139 | A | 5/1999 | Dorman |
| 6,393,688 | B1 | 5/2002 | Axner |
| 6,986,233 | B1 | 1/2006 | Covington |
| 7,690,297 | B1 | 4/2010 | Sagen |
| 7,975,607 | B2 | 7/2011 | Hoover |
| 10,306,839 | B2 | 6/2019 | Adams |
| 2004/0148920 | A1 | 8/2004 | Drost |
| 2005/0211111 | A1 | 9/2005 | Ropers |
| 2006/0038053 | A1 | 2/2006 | Giovannoni |
| 2007/0157825 | A1 | 7/2007 | Miller |
| 2009/0223388 | A1 | 9/2009 | Doyle |
| 2009/0272282 | A1 | 11/2009 | Fortier |
| 2014/0306054 | A1 | 10/2014 | Termanas |
| 2015/0313087 | A1 | 11/2015 | Acimas |
| 2016/0290798 | A1 | 10/2016 | Verhaeghe |
| 2019/0127096 | A1 * | 5/2019 | Goodhind ............. B65B 13/188 |
| 2019/0322063 | A1 * | 10/2019 | Rosser, Jr. ............. B30B 9/301 |

FOREIGN PATENT DOCUMENTS

| | | | | |
|---|---|---|---|---|
| DE | 102005003397 A1 * | 7/2006 | .......... | B30B 9/3032 |
| EP | 0589257 A1 * | 3/1994 | .......... | B30B 9/3003 |
| FR | 1452789 | 4/1966 | | |

* cited by examiner

BALE EJECT DOOR ASSEMBLY FOR BALING PRESSES

CROSS REFERENCE TO RELATED APPLICATIONS

This non-provisional utility application claims priority to U.S. Provisional Application No. 63/398,686 filed on Aug. 17, 2022 and entitled A Bale Eject Door Assembly for Baling Presses the disclosure of which is incorporated as if fully set forth herein.

TECHNICAL FIELD

The general technical field covered by the present invention relates to baling presses with bale eject doors, particularly, bale eject doors that lock and are opened to eject a fully formed bale.

BACKGROUND

A baling press can be used to bale many types of materials. The bales are densified by hydraulic or mechanical compression force which is retained by manual or automatic application of bale binding or tying material, such as wire ties, steel bands, or plastic straps. Some baling presses are suitable for baling a variety of materials. Occasionally, one type of material is baled and immediately followed by a bale of a different type of material. Such versatility is particularly useful at a commercial or municipal recycling facility. For baling most materials, the ram, bale eject door, baler ceiling, and/or baler floor, could have a slotted platen attached to insert wire ties, steel bands, or plastic straps to fully encircle the material(s) being baled. Usually materials compressed into a baling chamber (a/k/a densification chamber) require several cycles (charges) of the compression ram or other mechanical device with additional material added to achieve the desired bale density or bale length. In most cases, once the desired minimum bale density is achieved, the compressed material at increased density is restrained by encircling/securing with wire ties, metal bands, or plastic strapping. After securing the bale density with binding material, the compression ram is typically retracted from contact with the newly formed bale. Ordinarily, this retraction reduces the compression force against the bale eject door, so the bale eject door can be safely and easily unlocked and opened. The completed bale can then be ejected by the compression ram from the baling chamber, the bale eject door closed, then relocked, and a new bale can begin to be formed.

During the course of development, the inventors observed for the first time that, for some materials such as those with less memory (e.g., fibers, shredded paper, shredded cardboard, agricultural materials, like cotton gin trash), as the compression ram retracts from a newly formed and bound bale, the portion of the bale nearest the bale eject door does not significantly relax or decompress due, in large part, to the friction between the sides of the baling chamber against the bale. Thus, the bale continues to exert substantial force against the bale eject door making it difficult and unsafe to unlock the bale eject door. This may be true, for example, if the bale eject door has inside attachments or structural components to aid the insertion, manually or automatically, of binding material, such as wire ties, steel bands, or plastic straps or if it is an internal designed door. Such designs can hinder the insertion of binding material. This phenomenon is less prevalent (if not non-existent) for materials with more memory such as, for example, plastic bottles or foam rubber.

For years, slow-release locking mechanisms have been used to relieve the residual force exerted by the bale in these situations. In most cases, the slow-release mechanisms are positioned vertically along one edge of the baling chamber and the bale eject door hinge is generally located vertically along the opposing edge of the baling chamber. Some rectangular shaped doors (i.e., width greater than height in most cases) can be quite heavy and difficult to support with the small area available for a vertical hinge. Moreover, adjustments to the hydraulic rod extensions used to open and close doors become difficult when the bale eject doors are cantilevered a significant distance from the short vertical hinges—a condition that grows worse with hinge wear over time and use. Under or over extension of the cylinder rod produced by faulty adjustment can damage the hydraulic cylinder, damage the welded connection to the cylinder attachment ears, or completely break the connection between the attachment ears and the baling press side wall.

Some bale eject door unlocking or locking mechanisms used to address the normally expected issues described above include those that have a hinge attached vertically to the baling chamber structure and a door lock hinged flange with an "L" shaped structure also known as an "angle iron," In operation, as the flanged door lock rotates about the vertical hinge, the pressure on the bale eject door is slowly released. Other designs use hinged hook(s) attached to the end of a hydraulic cylinder rod that remain engaged to the bale eject door while the rod is slowly extended and until sufficient reduction in pressure is achieved permitting safe manual removal (by rotating the hinged hooks) of the hinged hooks from the bale eject door. Conventional hydraulic cylinders used to unlock chamber end doors, however, are typically affixed to the side wall of the baling chamber and oriented such that the piston rod extends in a direction substantially parallel to the baling chamber side wall. Moreover, such designs usually have cylinder strokes of 8 inches or more.

Unfortunately, such commonly used door lock designs have been known to either open (or potentially open) prematurely due to, for example, high compression pressures, prolonged compression pressure exposure, a leaking hydraulic component, lengthy cylinder strokes, improper cylinder orientation to the direction of the force applied to end doors and/or undersized cylinders. Some are simply of an unsuitable design for full or semi-automatic opening by a hydraulic cylinder (i.e., the hinged hook(s) design). Moreover, in the case of vertical hinge designs, as the end doors open, binding material is in contact with edges of the metal platen slots within the end door. For some types of binding material, such as plastic strapping, this contact causes damage to the binding material. Bale eject doors of full eject baling presses must be fully opened prior to the complete extrusion of the bale from the baling chamber by the compression ram.

SUMMARY

Herein described is a bale eject door assembly and locking mechanism designed to promote the safe opening of a bale eject door under pressure, to prevent premature (partial or total) door openings, to prevent failure or damage of essential structural components, and prevent damage to strapping and/or binding chutes or materials as the door is opened. Most, if not all, of these problems are at least in part caused by the residual pressure inside the bale eject door as described above which make it difficult and unsafe to unlock and open the bale eject door under these conditions. The present invention addresses these issues. The bale eject door assembly is suitable to use with full or total eject baling presses that may employ a single ram stroke of two or more parallel rams, as well as commonly used partial eject baling presses requiring multiple rams strokes.

In one embodiment, the bale eject door assembly comprises an end door (or bale eject door) engaged to and closing the terminal end of an baling chamber on a baling press. In another embodiment, the bale eject door assembly comprises a hinge. In some embodiments, the hinge can be positioned at the interlace between the top of the end door and the top of the baling chamber (door opening from the bottom raising upward), hi other embodiments, the hinge can be positioned at the interface between the bottom of the end door and the bottom of the baling chamber (door opening from the top lowering downward).

In one embodiment, the bale eject door assembly can include one or more cylinder rod assemblies comprising a cylinder and a piston rod engaged to the end door and baling chamber. The cylinder rod assemblies are designed to lock/unlock the end door (e.g, locking cylinder rod assembly) and open the end door (e.g., door cylinder rod assembly) and when the baling press end door can be easily and safely unlocked after the ram has been retracted from the bale without operator intervention, whether or not the bale nearest the eject door has relaxed or decompressed to reduce the pressure exerted on the end door. Opening may follow achievement of a threshold bale length, bale density or full bale densification and bale binding via plastic strapping, metal strapping, metal wire and the like.

In one embodiment, the one or more cylinder rod assemblies are hydraulically, pneumatically, or electrically powered. In another embodiment, the one or more cylinder rod assemblies are hydraulically powered.

In one embodiment, the one or more cylinder rod assemblies can include at least one door cylinder rod assembly. In some embodiments, the at least one door cylinder rod assembly includes a first cylinder end (end opposite a second cylinder end from which the piston rod extends) is secured to the baling chamber. In another embodiment, the first cylinder end is secured near the upper corner of the baling chamber where the baling chamber's lateral side surface and the top surface converge. In some embodiments, the first cylinder end is secured to the baling chamber by a bracket mounted to an baling chamber outer surface. In one embodiment the bracket is fixed and cannot be moved. In another embodiment, the bracket is adjustable and slidably engaged to the baling chamber, such that the distance between it and the end door can be manipulated. In other embodiments, the first cylinder end is fixedly secured a predetermined distance from the end door and, in some embodiments, the predetermined distance is adjustable.

In some embodiments, the at least one door cylinder rod assembly can include a first piston end (opposite end of the cylinder rod assembly to the first cylinder end) that can be secured to the end door. In one embodiment, the first piston end(s) is secured to one or more end door side supports affixed to or integral to the end door lateral sides. The one or more end door side supports can comprise an upper extended portion extending above the top of the end door, the end door hinge, and the top surface of the baling chamber. The upper extended portion can include a brace positioned at an upper extended portion terminus configured to secure the first piston end thereto. The upper extended portion can extend above the end door hinge a predetermined distance to provide adequate leverage to the one or more cylinder rod assemblies for end door opening/closing via pivot about the end door hinge.

In another embodiment, the bale eject door assembly can include a locking mechanism. In one embodiment, the locking mechanism can comprise at least one locking arm positioned and secured to the lateral side surface of the baling chamber. In one embodiment, the bale eject door assembly includes two locking arms positioned on opposite lateral side surfaces of the baling chamber. In another embodiment, the bale eject door assembly includes four locking arms—two arms attached to one lateral side surface and two arms attached to the opposite lateral side surface of the baling chamber chute. In another embodiment, the at least one locking arm is attached to the lateral side surface at two pivoting attachment points. The two pivoting attachment points can comprise a rear brace (positioned closer to the baling material infeed).

In the embodiment with four locking arms (two positioned on each lateral surface of the baling chamber), the rear brace can include two triangular shaped flanges extending from the lateral side surface of the baling chamber and aligned about a vertical axis. In one embodiment, each flange can include a flange aperture positioned at the vertex of the triangular shaped flange and configured to receive a pin. In another embodiment, each of the four locking arms can comprise a rear aperture and a front aperture also configured to receive pins. The rear aperture of the locking arm aligns with the flange aperture described above. In one embodiment, the upper locking arm (of the two locking arms positioned on one of the lateral side surfaces of the baling chamber) engages the upper surface of the upper flange and the lower locking arm engages the lower surface of the lower flange. In another embodiment, when the rear apertures of the locking arms are aligned with the flange apertures, a first pin can be inserted through both locking arms and flanges. The first pin can further comprise a head portion and a nut to ensure that the locking arms are adequately secured to the flanges.

In the embodiment with four locking arms (two positioned on each lateral side of the baling chamber), the bale eject door assembly can include a front brace which, in one embodiment, is a locking cylinder rod assembly. In some embodiments, a tower support member or cylinder (housing a piston) is affixed to and extends from the lateral side of the baling chamber substantially perpendicular to the baling chamber lateral surface. In the case of four locking arms, there should be two front braces or locking cylinder rod assemblies—one on each side of the baling chamber. The tower support can include a terminal extension comprising a terminal extension aperture configured to receive a pin. In embodiments comprising a locking cylinder rod assembly, the terminal extension can be an extendable rod or piston. In one embodiment, the front apertures of the locking arms align with the terminal extension aperture. In an embodiment, the upper locking arm engages the upper surface of the terminal extension, rod, or piston, and the lower locking arm engages the lower surface of the terminal extension, rod, or piston. In one embodiment, washers or spacers can be added between the locking arm and terminal extension surfaces. In another embodiment, when the front apertures of the locking arms are aligned with the terminal extension aperture, a second pin can be inserted through both locking arms and terminal extension of the front brace or locking cylinder assembly. The second pin can further comprise a head portion and a nut to ensure that the locking arms are adequately secured to the terminal extension.

In one embodiment, the one or more locking arms can comprise engagement hooks or probes positioned at one end of the arm (i.e., the end closest to the end door when the locking arm is secured to the baling chamber). The end door can comprise slots configured to receive the engagement hooks when the locking arms are in a closed position and the end door closed. In one embodiment, the slots are positioned within the end door side supports at the bottom of the end door on the same horizontal and vertical plane as the engagement hooks. In some embodiments, wear inserts can be attached to an interior hook surface, which is the hook surface that will encounter most of the friction or force from a door under pressure from a fully densified bale. Likewise, wear inserts can be inserted into the slots at the point of contact with the engagement hooks. The one, two, three or more engagement hooks (probes) enter the slots within the end door prior to compaction and the beginning of densification. When said end door is desired to be opened (to eject a densified mass of material or a wire tied or strapped bale of any type of materials), the engagement hooks disengage the slots so the end door can be lifted up (or opened down) with the horizontal sectional end door hinge. The engagement hooks disengage when piston extends outward away from the lateral sides of the baling chamber and engage when piston retracts toward the lateral sides of the baling chamber. In some embodiments, the locking cylinder rod assemblies have a cylinder stroke range between about 1" to 2". In some embodiments, the stroke range is about 1.5".

Additional embodiments include those described in the number paragraphs below:

1. A bale eject door assembly for a baling press comprising:
    an end door comprising a hinge and at least one end door side support comprising a first end proximate said hinge and a second end opposite said first end, wherein said at least one end door side support is positioned on opposite sides of the end door and are substantially perpendicular to said hinge;
    one or more door cylinder piston assemblies configured to open and close said end door; and
    one or more locking mechanisms comprising at least one locking cylinder piston assembly, at least one locking arm, at least one rear brace, and at least one slot positioned proximate to said second end of said end door side support;
    wherein said baling press comprises a baling chamber comprising a central axis extending through the length of said baling chamber, and exterior chamber walls;
    wherein said at least one locking cylinder assembly is affixed to and protruding from at least one of said chamber walls along an axis substantially perpendicular to said baling chamber central axis.

2. The bale eject door assembly of 1 wherein said end door comprises two end door side supports.

3. The bale eject door assembly of 1 wherein said at least one locking arm further comprises an engagement hook configured for insertion into said at least one slot.

4. The bale eject door assembly of 1 wherein said at least one rear brace comprises one or more triangular shaped flanges affixed to at least one exterior chamber wall of the baling chamber.

5. The bale eject door assembly of 1 wherein said locking cylinder piston assembly comprises a cylinder stroke distance between about 1" and 7.5".

6. The bale eject door assembly of 5 wherein said cylinder stroke distance is between about 1" to 5".

7. The bale eject door assembly of 6 wherein said cylinder stroke distance is between about 1" and 2".

8. The bale eject door assembly of 7 wherein said cylinder stroke distance is about 1.5".

9. The bale eject door assembly of 4 wherein said triangular shaped flanges comprise a vertex distal said exterior wall of said baling chamber wherein said vertex comprises an aperture configured to receive a first pin and wherein said locking cylinder piston assembly comprises an aperture configured to receive a second pin.

10. The bale eject door assembly of 9 wherein said at least one locking arm comprises a rear aperture configured to receive the first pin and a front aperture configured to receive the second pin.

11. The bale eject door assembly of 3 wherein said engagement hook comprises a wear insert.

12. The bale eject door assembly of 11 wherein said engagement hook comprises an interior face and wherein said wear insert is affixed to said interior face.

13. The bale eject door assembly of 12 wherein said wear insert comprises an angled contact surface configured to reduce the force needed to disengage said engagement hooks from said slots.

14. The bale eject door assembly of 13 wherein said wear insert is replaceable.

15. The bale eject door assembly of 14 wherein said wear insert comprises a material selected from ultra-high molecular weight polyethylene (UHMWPE), PTFE, Teflon, nylon, acetal, and machinable metal.

16. The bale eject door assembly of 1 wherein said baling chamber comprises an upper exterior wall, a left side exterior wall, and a right side exterior wall.

17. The bale eject door assembly of 16 wherein said hinge is affixed at a junction between a side edge of the end door and a side rim of said baling chamber and wherein said locking cylinder piston assembly is affixed to said upper exterior wall.

18. The bale eject door assembly of 16 wherein said hinge is affixed at a junction between an upper edge of the end door and an upper rim of said baling chamber and wherein said at least one locking cylinder piston assembly is affixed to said left side exterior wall and/or said right side exterior support.

19. The bale eject door assembly of 18 comprising a first locking cylinder piston assembly affixed to said left side exterior wall and second locking cylinder piston assembly affixed to said right side exterior wall.

20. The bale eject door assembly of 1 wherein said locking cylinder assembly axis and said baling chamber central axis forms an angle between about 90 degrees and about 45 degrees.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The terms "a," "an," and "the," as used herein, generally refers to singular and plural references unless the context clearly dictates otherwise.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, the use of these terms in the specification does not by itself connote any required priority, precedence, or order.

Figure 1:
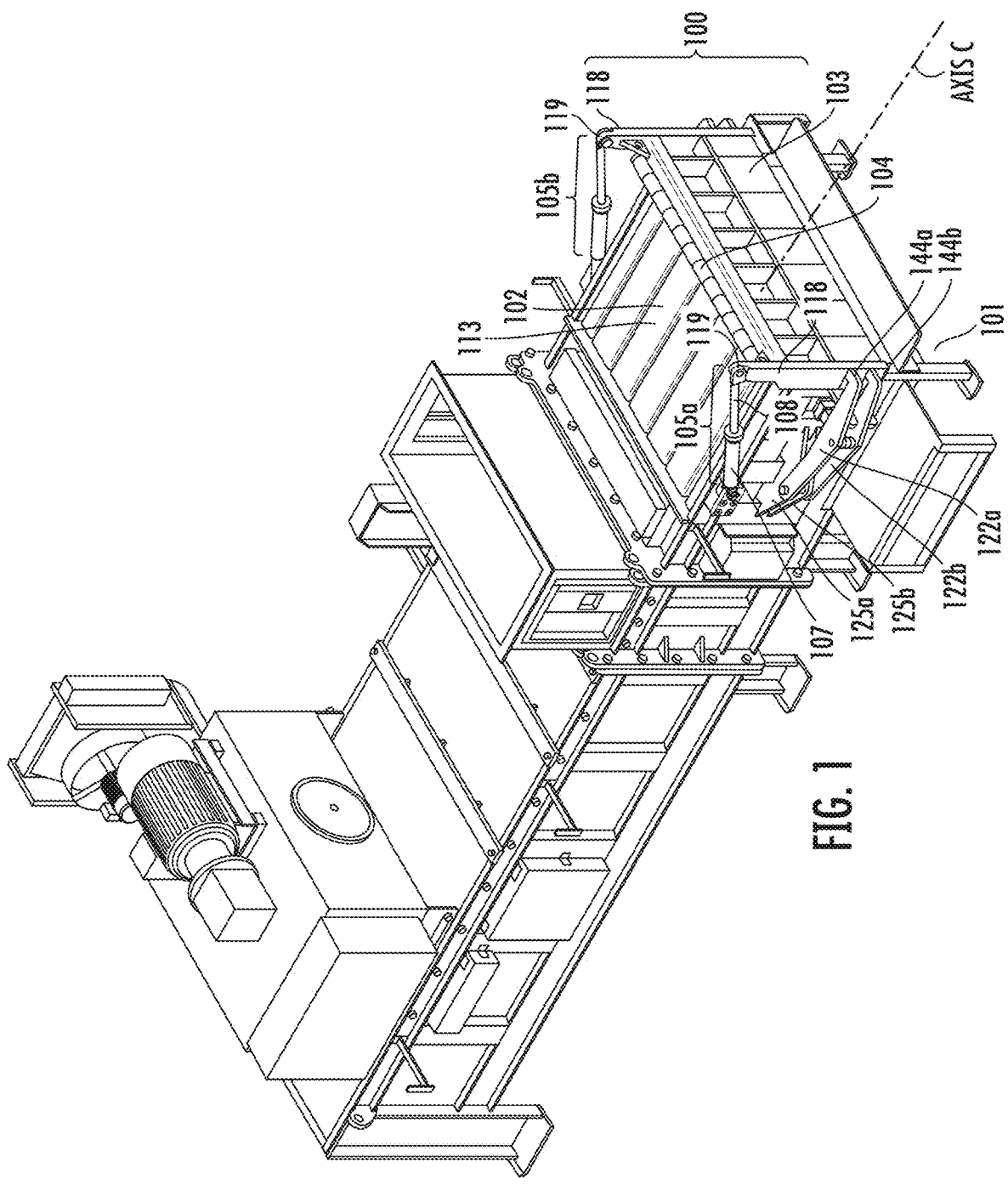
FIG. 1 illustrates an elevated side perspective of a horizontal baling press including an embodiment of the bale eject door assembly with the end door in closed and locked position.
Figure 2:
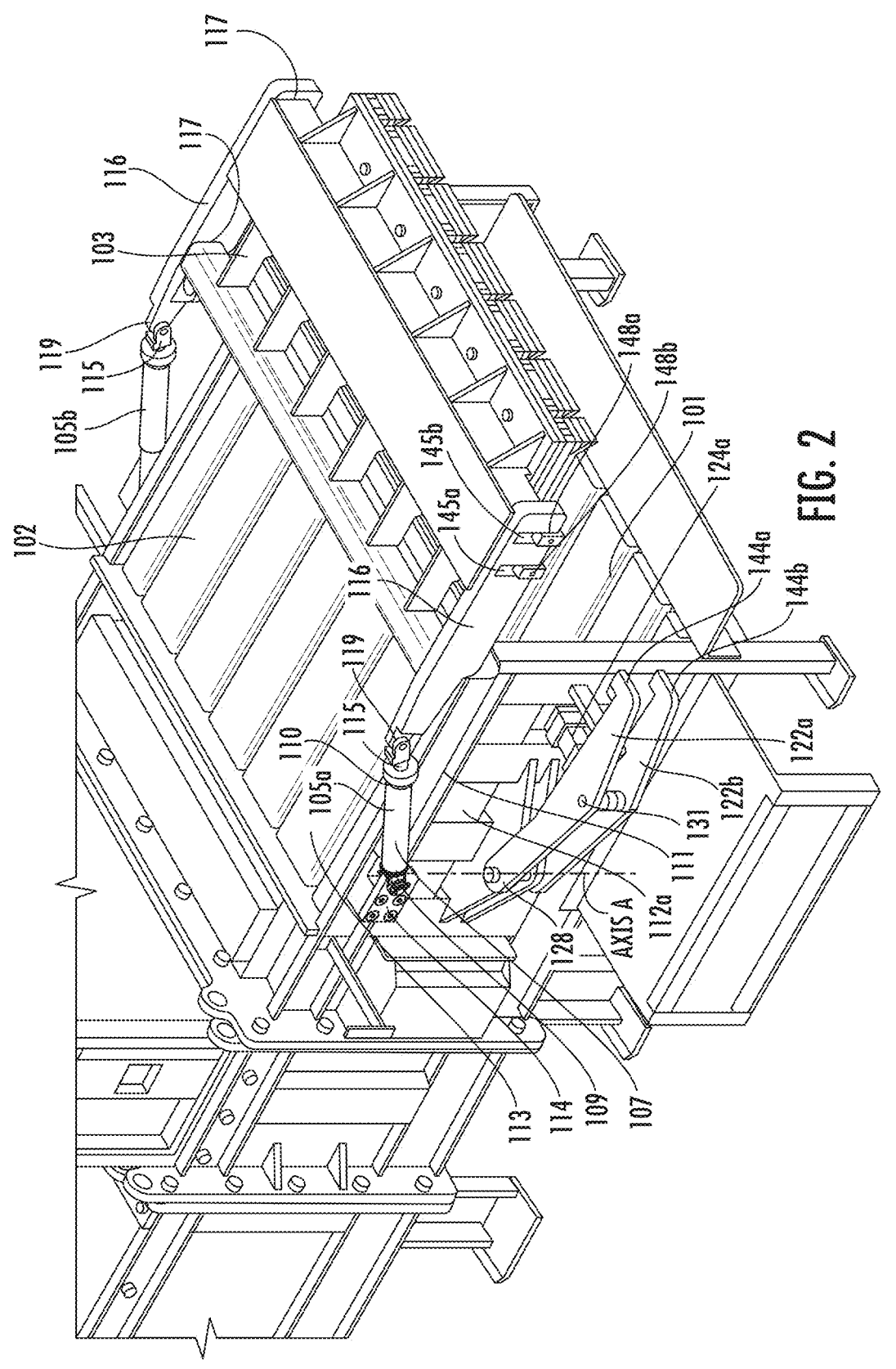
FIG. 2 illustrates an elevated side perspective of an embodiment of the bale eject door assembly with the end door in open and unlocked position.

Referring now to FIGS. 1-6, an embodiment of the bale eject door assembly 100 is generally shown installed and positioned at the bale exit end 101 of a baling chamber 102 of a horizontal baling press. The novel bale eject door assembly 100 improves the safety associated with opening an end door 103 that is under pressure due to force applied by a densified and bound (or tied) bale, to prevent end doors 103 from opening prematurely, and to prevent failure or damage of essential structural components, including, for example, end door hinges 104 and cylinder rod assemblies 105 including, in some embodiments, at least one door cylinder rod assembly 105a and at least one locking cylinder rod assembly 105b. Furthermore, the bale eject door assembly improves the force required to remove engagement hooks (described in detail below) which is often necessary in order to open the end door 103. The bale eject door assembly is suitable to use with partial eject and/or full/total eject baling presses. FIG. 1 and FIG. 2 illustrate a bale eject door assembly with an end door in a closed and open position respectively.

As shown in FIGS. 1-2, the bale eject door assembly comprises an end door 103, an end door hinge 104, and one or more cylinder rod assemblies 105. As shown in FIGS. 1 and 2, the end door 103 (or bale eject door) can be affixed to the bale exit end 101 of an baling chamber 102 on a baling press. The bale eject door assembly 100 comprises an end door hinge 104 configured to affix the end door 103 to the bale exit end 101 of the baling chamber 102. As illustrated in FIGS. 1-6, the end door hinge 104 can be positioned at the interface between the top of the end door 103 and the lop of the baling chamber 102. In this embodiment, the end door 103 opens from the bottom pivoting about the end door hinge 104 located at the top.

In the embodiment shown in FIGS. 1-6, the bale eject door assembly can also include one or more door cylinder rod assemblies (shown generally at 105a in the figures) comprising a cylinder 107 and a piston rod 108 engaged to the end door 103 and baling chamber 102. The one or more door cylinder rod assemblies 105a are designed to open the end door when it is safe and practical to do so following attainment of a threshold bale length, density or full bale densification and preceded by bale binding via plastic strapping, metal strapping, metal wire and the like. The one or more door cylinder rod assemblies 105a can be hydraulically or pneumatically powered and can control speed in which the end door opens (e.g., slow down) keeping the door from opening too quickly and dangerously when the engagement hooks disengage (described in greater detail below). The bale eject door assembly 101 embodiment shown in FIGS. 1-6 comprises two door cylinder rod assemblies 105a positioned on opposite lateral sides of the baling chamber 102.

Figure 5:
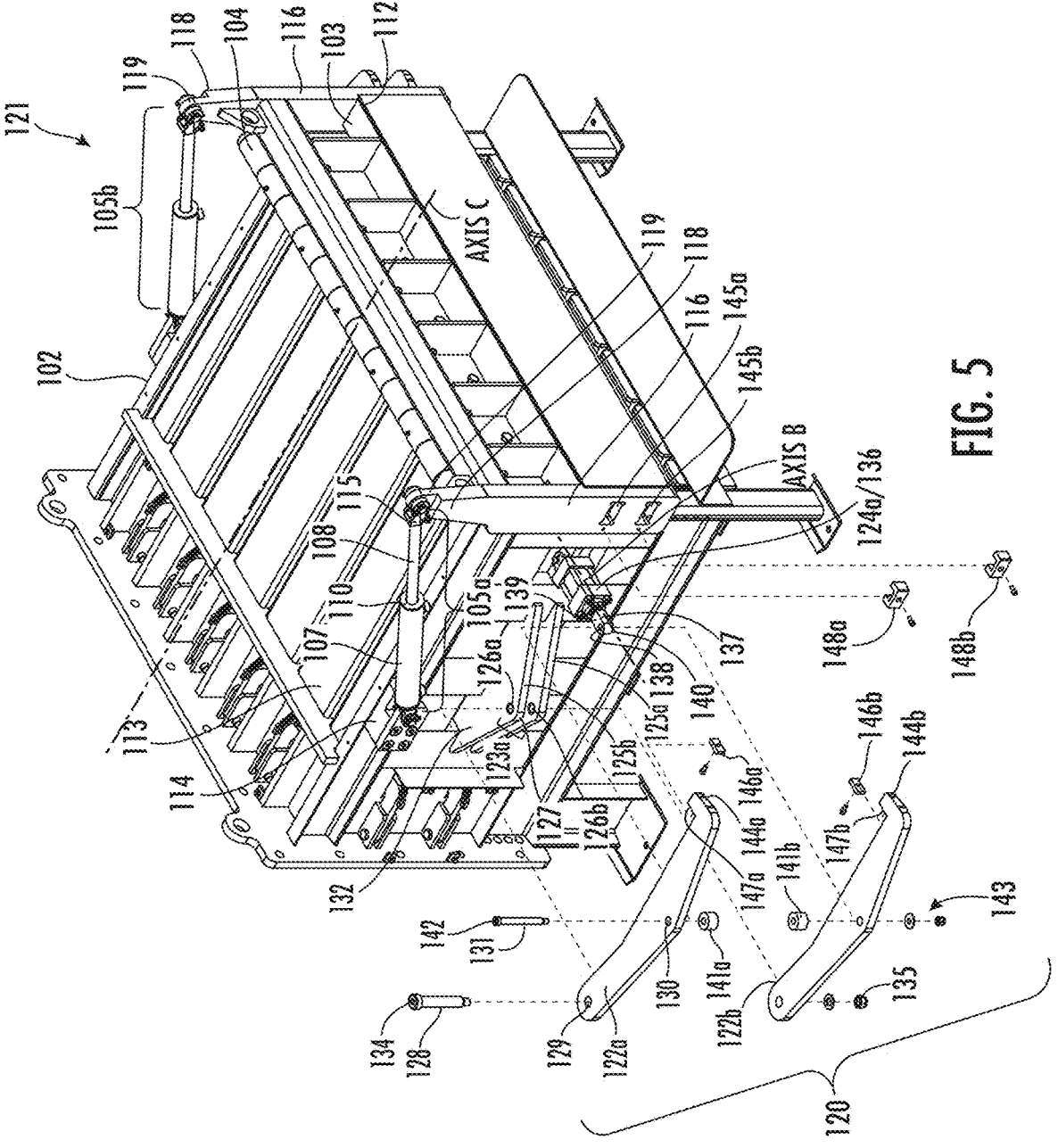
FIG. 5 illustrates an exploded perspective of an embodiment of the locking mechanism as well as other components of the bale eject door assembly.
Figure 6:
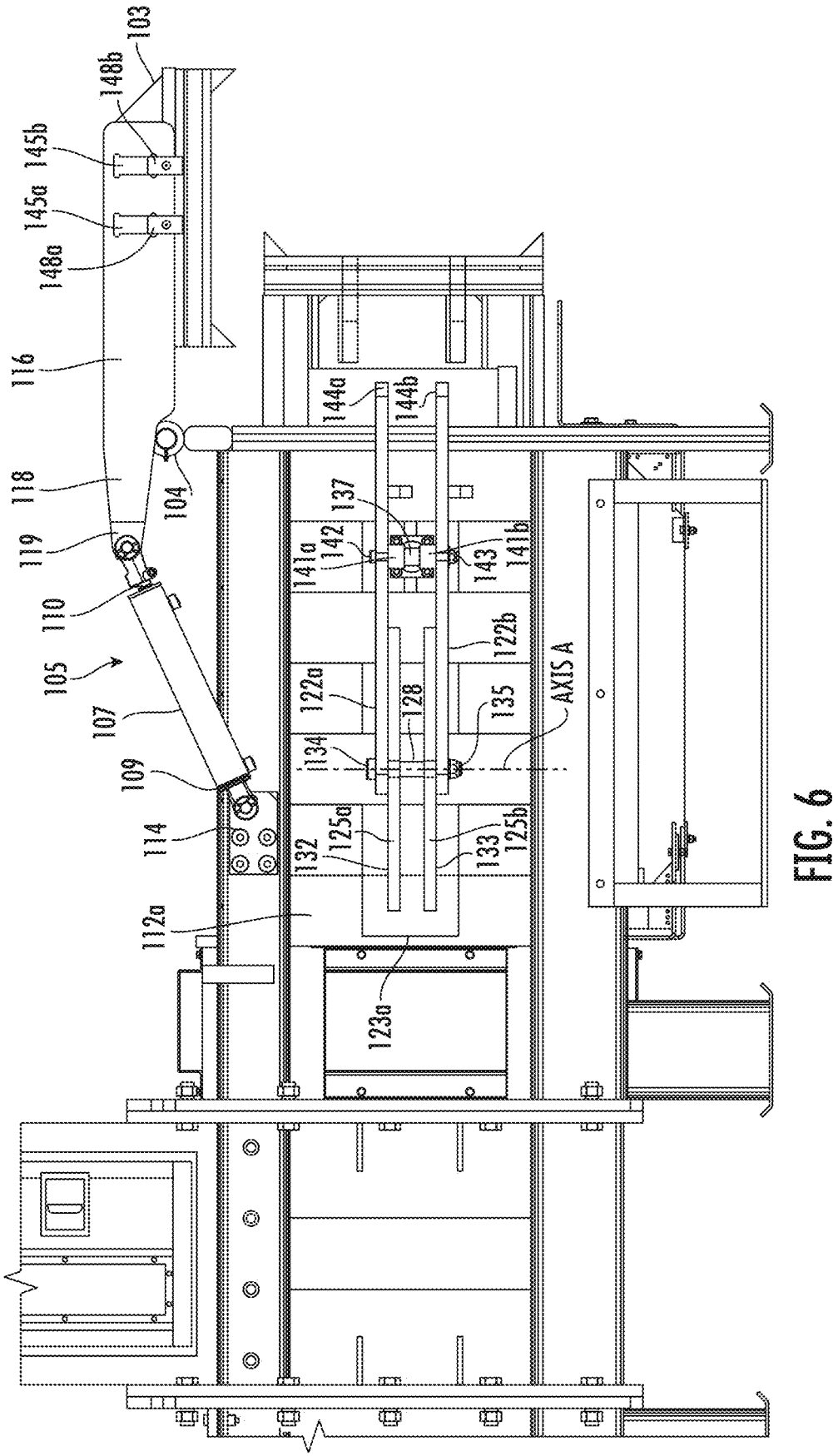
FIG. 6 illustrates a side perspective of an embodiment of the bale eject door assembly with door in a fully opened and unlocked position.

Referring to FIG. 5 for illustration, the cylinder 107 of each door cylinder rod assembly 105a can comprise a first cylinder end 109 (end opposite a second cylinder end 110 from which the piston rod 108 extends) that is secured to the baling chamber 102. In one embodiment, the first cylinder end 109 is secured near the upper corner 111 of the baling chamber 102 where the baling chamber's lateral side surface 112 and top surface 113 converge. In some embodiments, the first cylinder end 109 is secured to the baling chamber 102 by a bracket 114 mounted to a baling chamber outer surface. In one embodiment the bracket 114 is fixed. In another embodiment, the bracket 114 is adjustable and slidably engaged to the baling chamber 102, such that the distance between it and the end door 103 can be manipulated. In other embodiments, the first cylinder end 109 is fixedly secured a predetermined distance from the end door and, in some embodiments, the predetermined distance is adjustable. For example, in some embodiments, the predetermined distance is 14 inches (14 inch stroke cylinders—maximum extended piston distance).

With continued reference to FIG. 5 for illustration, the piston rod 108 of each door cylinder rod assembly 105a can comprise a first piston end 115 (opposite end of the cylinder rod assembly 105 to the first cylinder end 109) that can be secured to the end door 103. In one embodiment, the first piston end 115 can be secured to one or more end door side supports 116 affixed to or integral to the end door lateral sides 117. The one or more end door side supports 116 can comprise an upper extended portion 118 extending above the top of the end door 103, the end door hinge 104, and the top surface 113 of the baling chamber. The upper extended portion 118 can include a brace 119 positioned at an upper extended portion terminus configured to secure the first piston end thereto. In some embodiments, the upper extended portion 118 can extend above the end door hinge 104 a predetermined distance to provide sufficient leverage to the one or more door cylinder rod assemblies 105a for end door opening/closing via pivot about the end door hinge and provide sufficient door elevation to permit unobstructed bale ejection (e.g., at least 90 degree rotation from closed to open position).

With continued reference to FIG. 5, the bale eject door assembly can include one or more locking mechanisms shown generally at 120 and 121. The embodiment shown in FIGS. 1-6 contains two locking mechanisms (120 and 121), one on each side of the baling chamber 102, In one embodiment, the locking mechanism (e.g., 120) can comprise at least one locking arm 122 positioned and secured to the lateral side surface 112 of the baling chamber 102. In another embodiment, the bale eject door assembly can include two locking arms total—one positioned on a first lateral side surface 112a and one positioned on a second lateral side surface 112b of the baling chamber 102, Referring to the embodiment in FIG. 5, the bale eject door assembly can include four locking arms total—two arms (122a, 122b) positioned to one lateral side surface 112a and two arms (122c, 122d) affixed to the opposite lateral side surface 112b of the baling chamber 112b.

With continued reference to FIG. 5, the at least one locking arm (e.g., 122a) can be attached to the lateral side surface (e.g., 112a) at two attachment points. The two attachment points can comprise a rear brace 123a (positioned closer to the baling material infeed) and a front brace 124a (positioned closer to the end door). In the embodiment shown in FIG. 5, the front brace 124a is a locking cylinder rod assembly (same reference number 124a). In the embodiment shown in FIG. 5 comprising four locking arms (122a-d), there are two rear braces (123a b) and two front braces (124a b)—each rear/front brace set affixed to opposite lateral side surfaces (112a-b) of the baling chamber.

With continued reference to FIG. 5, in the embodiment with four locking arms, an exemplary rear brace 123a can include two triangular shaped flanges 125a-b extending from the lateral side surface 112a of the baling chamber and aligned about a vertical axis (A). In one embodiment, each flange can include a flange aperture 126a-b positioned at the vertex 127 of the triangular shaped flange and configured to receive a pin 128. In another embodiment, each of the four locking arms (e.g., 122a) can comprise a rear aperture 129 and a front aperture 130 also configured to receive pins 128 and 131, respectively. The rear aperture 129 of the locking arm aligns with the flange aperture 126a described above. In one embodiment, the upper locking arm 122a (of the two locking arms positioned on one of the lateral side surfaces of the baling chamber) engages the upper surface 132 of the upper flange 125a and the lower locking arm 122b engages the lower surface 133 of the lower flange 125b. In another embodiment, when the rear apertures 129a-b of the locking arms are aligned with the flange apertures 126a-b, a first pin 128 can be inserted through both locking arms and flanges. The first pin 128 can further comprise a head portion 134 and a nut 135 to ensure that the locking arms are adequately secured to the flanges.

Continuing with FIG. 5, in the embodiment with four locking arms, an exemplary front brace or locking cylinder rod assembly (according to FIG. 5) 124a (only one side of the baling chamber fully visible) can comprise a tower support member or cylinder (e.g., hydraulic cylinder) 136 affixed to and extending from the lateral side surface 112a of the baling chamber 102 along axis (B) which, in the embodiment shown in FIG. 5, is substantially perpendicular to the lateral side surface 112a of baling chamber 102. In one embodiment, the angle between axis (B) and lateral side surface 112a (or, as another reference point, an axis (C) extending through the baling chamber as shown in FIG. 1) is 90°. In another embodiment, the angle is slightly less than 90° and, in yet another embodiment, the angle is between 45° and 90°. In the case of four locking arms, there should be two front braces (124a (shown) and 124b (not shown))—one on each side of the baling chamber. In some embodiments, the tower support member or cylinder 136 can include a terminal extension, rod or piston 137 comprising a terminal extension aperture 138 configured to receive a pin.

In one embodiment, the front apertures 130a-b of the locking arms align with the terminal extension aperture 138. In another embodiment, the upper locking arm 122a engages an upper surface 139 of the terminal extension, rod, or piston 137, and the lower locking arm 122b engages the lower surface 140 of the terminal extension, rod, or piston 137. In one embodiment, washers (e.g., 141a-b) can be added between the locking arm and terminal extension surfaces 139 and 140. In another embodiment, when the front apertures 130a-b of the locking arms are aligned with the terminal extension aperture 138, a second pin 131 can be inserted through both locking arms and terminal extension, rod, or piston 137 of the front brace. The second pin 131 can further comprise a head portion 142 and a nut 143 to ensure that the locking arms are adequately secured to the terminal extension, rod, or piston 137. When a locking cylinder rod assembly 124a is utilized, terminal extension, rod, or piston 137 extends along axis (B) as described above. In some embodiments, locking cylinder rod assemblies 124a have a cylinder stroke distance of between 1" and 7.5". In another embodiment, the cylinder stroke distance is between about 1" to 5" or between about 1" and 2". In yet another embodiment, the stroke range is about 1.5".

It should be noted that though the locking mechanism, including the locking cylinder rod assemblies 124a are shown in FIG. 5 to be positioned on the baling chamber lateral side surface 112a, the locking mechanism components can be positioned on top of the baling chamber for end doors that open from the side i.e., hinges vertical and positioned on the side of the door. In such embodiments, door cylinder rod assemblies can be positioned appropriately in relation to the vertical side hinge (e.g., on the lateral side surface 112a).

Figure 3:
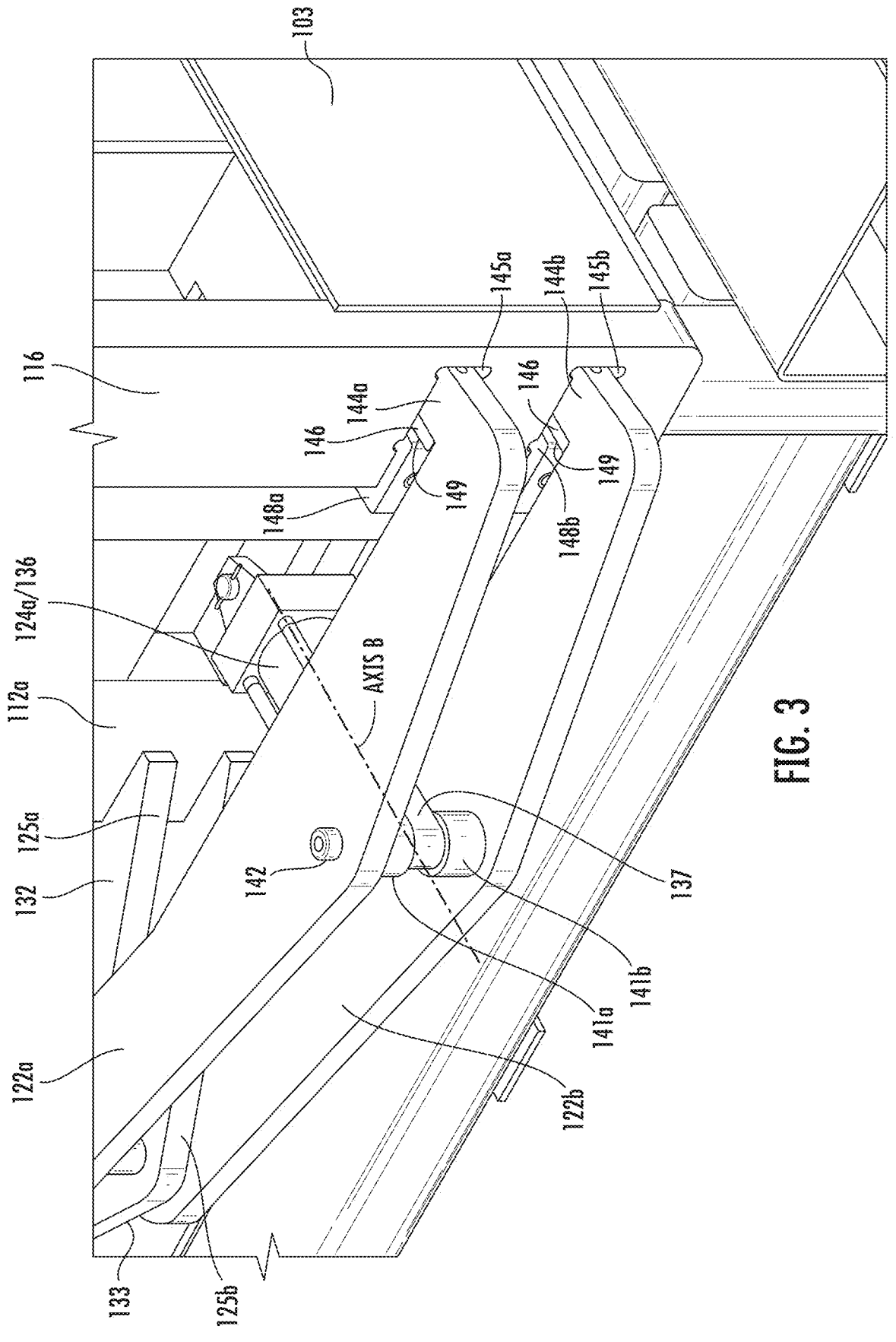
FIG. 3 illustrates a close-up perspective of an embodiment of the locking mechanism particularly two locking arms with engagement hooks engaged to the slots and with end door in a closed and locked position.
Figure 4:
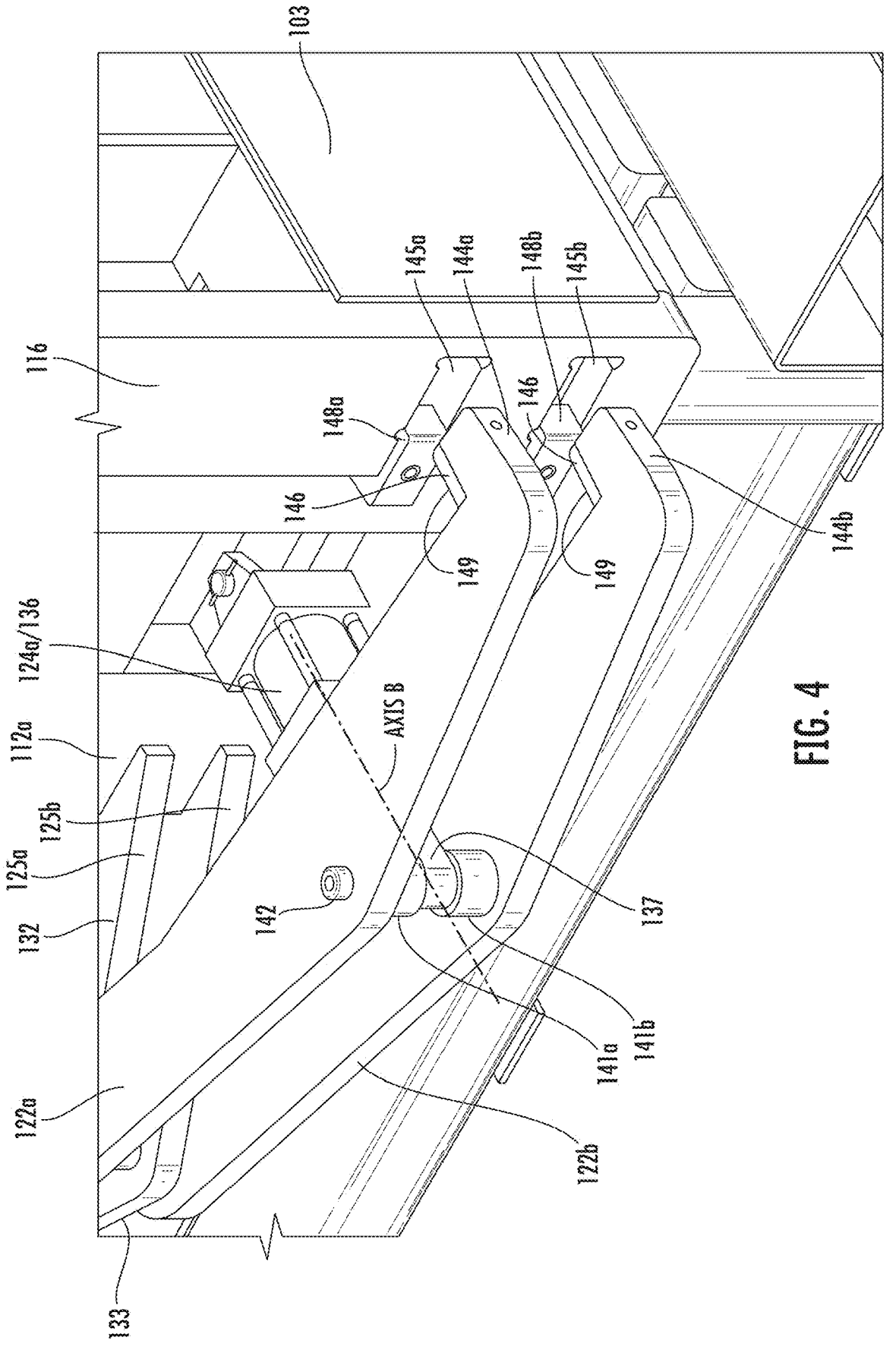
FIG. 4 illustrates a close-up perspective of an embodiment of the locking mechanism particularly two locking arms with engagement hooks disengaged with the slots but with end door remaining in a closed position.

In the embodiment shown in FIGS. 4 and 5, the one or more locking arms (see e.g., 122a-b—only two shown due to figure perspective) can comprise engagement hooks or probes 144a-b positioned at one end of the arms (i.e., the end closest to the end door when the locking arm is secured to the baling chamber). The end door 103 can comprise slots 145a-b configured to receive the engagement hooks 144a-b when the locking arms are in a closed position and the end door closed as shown in FIG. 1 and FIG. 3. In one embodiment, the slots 145a-b are positioned within the end door side supports 116 at the bottom of the end door 103 on the same horizontal and vertical plane as the engagement hooks so that the hooks are easily inserted into the slots.

Referring to FIGS. 3-4, in some embodiments, wear inserts 146a-b can be attached to an interior hook surface 147a-b, which is the hook surface that will encounter most of the friction or force from a door under pressure from a fully densified bale. Likewise, wear inserts 148a-b can be inserted into the slots at the point of contact with the engagement hooks. The wear inserts can be designed or configured to reduce the amount of force required to disengage the engagement hooks from the slot and substantially reduce costs associated with normal friction induced wear. In some embodiments, wear insert (147 and 148) positions can be adjusted and/or the wear insert's shape can be altered to manipulate (e.g., reduce) the force needed to retract the locking arms from the slots. For example, the shape of a wear insert's contact surface 149 can be angled. In other embodiments, the wear inserts are replaceable. Other methods to reduce the force required to disengage hooks from slots and retract the locking arms include but are not limited to adjusting the angle of the wear insert's profile or face (aka contact surface 149), the angle of hook entry into the slots so that the point of contact is likewise adjusted, as well as changing the type of material used. In one embodiment, wear inserts are made of ultra-high molecular weight polyethylene (UHMWPE) also known as high modulus polyethylene (HMPE), PTFE, Teflon, nylon, acetal, a machinable metal, or the like. In a preferred embodiment, wear inserts are made of UHMWPE. The one, two, three or more engagement hooks (probes) enter the slots within the end door prior to compaction and the beginning of densification. When said end door is desired to be opened (to eject a densified mass of material or a wire tied or strapped bale of any type of materials), the engagement hooks disengage the slots so the end door can be lifted up (or opened down) with the horizontal sectional end door hinge.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, relative proportions and process/method step sequences set forth herein which depend upon a variety of conditions and variables. It should be understood that various alternatives to the embodiments of the invention, including for example, method step sequence described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A baling press comprising:
   a baling chamber in which a bale is formed, the baling chamber comprising four exterior walls;
   a ram; and
   a bale eject door assembly comprising,
      an end door comprising a hinge and at least one end door side support comprising a first end proximate said hinge and a second end opposite said first end, wherein each end door side support is mounted to a first side and/or a second side of the end door and is substantially perpendicular to said hinge;
      one or more door cylinder piston assemblies configured to open and close said end door; and
      one or more locking mechanisms comprising at least one locking cylinder piston assembly comprising a piston rod, at least one locking arm, at least one rear brace, and at least one slot positioned proximate to said second end of said end door side support;
      wherein each said locking cylinder piston assembly is mounted to at least one of said four exterior walls of said baling chamber such that said piston rod and said at least one of said four exterior walls form an angle between about 45 degrees and 90 degrees.

2. The baling press of claim 1 wherein said at least one end door side support comprises a first end door side support mounted to said first side of said end door and a second end door side support mounted to said second side of said end door.

3. The baling press of claim 1 wherein each locking arm comprises an engagement hook configured for insertion into a corresponding slot of said at least one slot.

4. The baling press of claim 1 wherein said at least one rear brace comprises one or more flanges mounted to said at least one of said four exterior walls of said baling chamber and configured to pivotally engage each locking arm.

5. The baling press of claim 1 wherein said locking cylinder piston assembly comprises a cylinder stroke distance between about 1" and 7.5".

6. The baling press of claim 5 wherein said cylinder stroke distance is between about 1" to 5".

7. The baling press of claim 6 wherein said cylinder stroke distance is between about 1" and 2".

8. The baling press of claim 7 wherein said cylinder stroke distance is about 1.5".

9. The baling press of claim 4 wherein each of said one or more flanges is a triangular shaped flange comprising a vertex distal said exterior wall of said baling chamber wherein said vertex comprises an aperture configured to receive a first pin and wherein said piston rod comprises an aperture configured to receive a second pin.

10. The baling press bale eject deer assembly of claim 9 wherein each locking arm comprises a rear aperture configured to receive the first pin and a front aperture configured to receive the second pin.

11. The baling press of claim 3 wherein said engagement hook comprises a wear insert.

12. The baling press of claim 11 wherein said engagement hook comprises an interior face and wherein said wear insert is affixed to said interior face.

13. The baling press of claim 12 wherein said wear insert comprises an angled contact surface.

14. The baling press of claim 13 wherein said wear insert is replaceable.

15. The baling press of claim 14 wherein said wear insert comprises a material selected from ultra-high molecular weight polyethylene (UHMWPE), PTFE, nylon, acetal, and machinable metal.

16. The baling press of claim 1 wherein said hinge is mounted at a junction between a side edge of the end door and a side rim of said baling chamber, wherein said four exterior walls of said baling chamber comprise a top wall, a bottom wall, a first sidewall, and a second sidewall, and wherein each locking cylinder piston assembly is affixed to said baling chamber top wall.

17. The baling press of claim 1 wherein said hinge is mounted at a junction between an upper edge of the end door and an upper rim of said baling chamber, wherein said four exterior walls of said baling chamber comprise a top wall, a bottom wall, a first sidewall, and a second sidewall, and wherein each locking cylinder piston assembly is mounted to said first side wall and/or said second side wall of said baling chamber.

18. The baling press of claim 17 wherein said at least one locking cylinder piston assembly comprises a first locking cylinder piston assembly mounted to said first sidewall of said baling chamber and a second locking cylinder piston assembly mounted to said second sidewall of said baling chamber.

19. The baling press of claim 1 wherein said angle between said piston rod and said at least one of said four exterior walls is about 90 degrees.

* * * * *